United States Patent
Takeda et al.

[19]

[11] Patent Number: 6,105,883
[45] Date of Patent: Aug. 22, 2000

[54] FUEL INJECTOR FOR AN INTERNAL COMBUSTION ENGINE

[75] Inventors: Keiso Takeda, Mishima; Shinzo Kobuki, Toyota; Tomojiro Sugimoto, Susono; Susumu Kojima, Susono; Nobuhiko Koga, Susono; Tomoji Ishikawa, Okazaki, all of Japan

[73] Assignee: Toyota Jidosha Kabushiki Kaisha, Toyota, Japan

[21] Appl. No.: 09/172,159

[22] Filed: Oct. 14, 1998

[30] Foreign Application Priority Data

Oct. 17, 1997 [JP] Japan ................................ 9-285680

[51] Int. Cl.$^7$ .............................. B05B 1/34; F02M 61/00
[52] U.S. Cl. ........................................ 239/463; 239/533.12
[58] Field of Search ..................... 239/597, 601, 239/533.2, 533.3, 533.7, 533.8, 533.9, 533.12, 461, 463

[56] References Cited

U.S. PATENT DOCUMENTS

| | | | |
|---|---|---|---|
| 4,365,746 | 12/1982 | Tanasawa et al. | 239/533.12 |
| 5,058,549 | 10/1991 | Hashimoto et al. | 239/601 |
| 5,109,823 | 5/1992 | Yokoyama et al. | 123/472 |
| 5,109,824 | 5/1992 | Okamoto et al. | 123/472 |
| 5,207,384 | 5/1993 | Horsting | 239/463 |
| 5,492,277 | 2/1996 | Tani et al. | 239/601 |
| 5,533,482 | 7/1996 | Naitoh | 239/533.12 |
| 5,685,485 | 11/1997 | Mock et al. | 239/533.12 |
| 5,716,009 | 2/1998 | Ogihara et al. | 239/601 |
| 5,899,390 | 5/1999 | Arndt et al. | 239/596 |

FOREIGN PATENT DOCUMENTS

| | | |
|---|---|---|
| 3-78562 | 4/1991 | Japan . |
| 5-272432 | 10/1993 | Japan . |
| 9846 | 9/1923 | Netherlands . |

*Primary Examiner*—Andres Kashnikow
*Assistant Examiner*—Davis Hwu
*Attorney, Agent, or Firm*—Oliff&Berridge, PLC

[57] ABSTRACT

A fuel injector for an internal combustion engine is disclosed. An injection hole thereof has a width larger than a height thereof. In the fuel injector, the fuel before being injected is imparted with a swirl component about the center axis of the injection hole by a spiral groove.

14 Claims, 4 Drawing Sheets

FUEL INJECTOR FOR AN INTERNAL COMBUSTION ENGINE

BACKGROUND OF THE INVENTION

1. Field of the Invention

The present invention relates to a fuel injector for an internal combustion engine.

2. Description of the Related Art

According to Japanese Unexamined Patent Publication No. 5-272432, the injection hole of a fuel injector is formed like a slit. The fuel injected from this injection hole forms a flat triangular spray having a relatively small thickness and in which nearly all the fuel comes into sufficient contact with the air and is favorably atomized. The injection hole is communicated with a single fuel reservoir in the fuel injector. The fuel is injected through the injection hole as the pressure of the fuel in the fuel reservoir is increased.

In the above-mentioned fuel injector, the velocity of injection of the fuel from each portion of the injection hole is not uniform even if the same fuel pressure is exerted from the fuel reservoir on each of the portion of the injection hole, i.e., the velocity of injection at both ends is affected by the wall surfaces of the injection hole and is generally retarded behind that of the central portion of the injection hole. When the velocity of injection is set to favorably diffuse the fuel that is injected from the central portion of the injection hole, therefore, the velocity of injection of the fuel from each end of the injection hole is very low, and the fuel is excessively diffused on both sides of the triangular fuel spray. Therefore, the above-mentioned fuel injector is not capable of producing a fuel spray which provides a generally favorable degree of diffusion.

SUMMARY OF THE INVENTION

The object of the present invention, therefore, is to provide a fuel injector for an internal combustion engine capable of forming a triangular fuel spray which realizes a generally favorable degree of diffusion.

According to the present invention, there is provided a fuel injector comprising an injection hole which has a width larger than a height thereof and means for imparting to the fuel, before it is injected, with a swirl component about the center axis of said injection hole.

BRIEF DESCRIPTION OF THE DRAWINGS

FIG. 2 is viewed from the direction of arrow A.

DESCRIPTION OF THE PREFERRED EMBODIMENT

Figure 1:
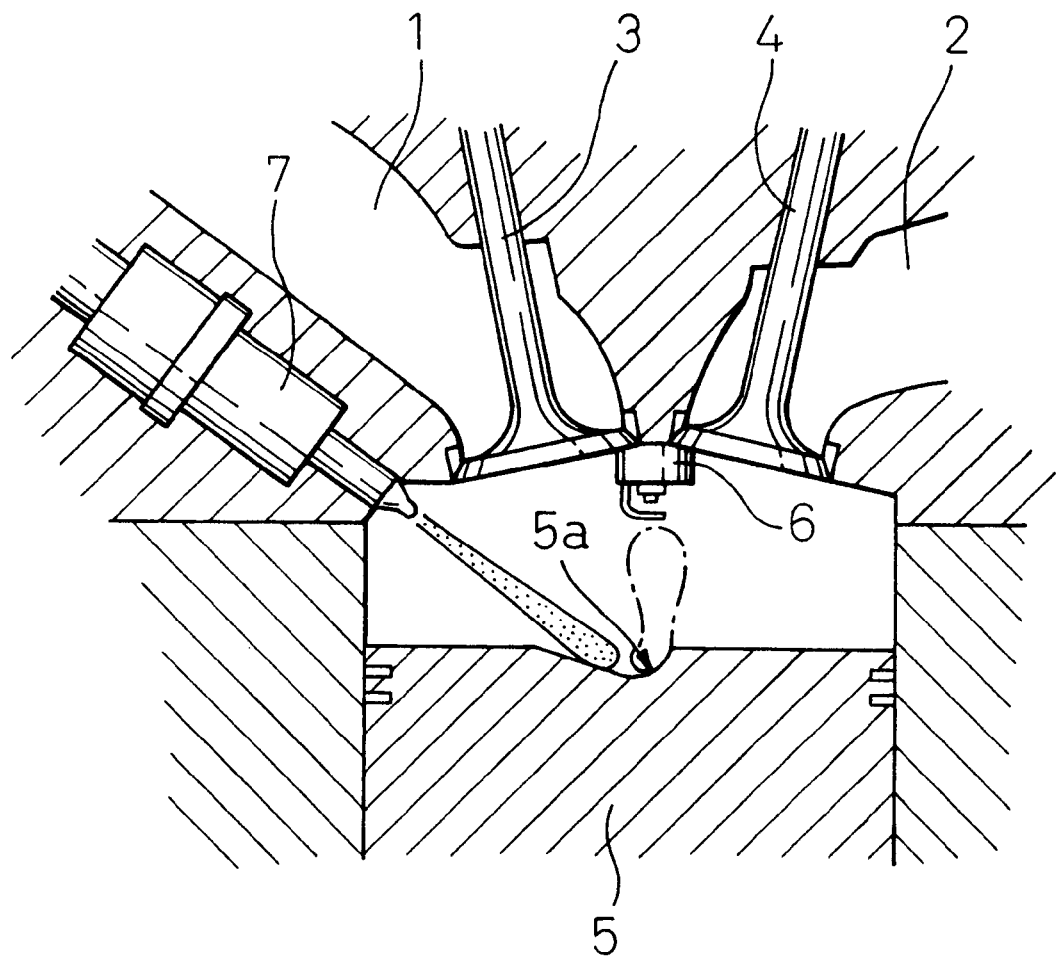
FIG. 1 is a sectional view schematically illustrating part of a direct injection-type spark-ignition internal combustion engine equipped with a fuel injector according to the present invention.

FIG. 1 is a sectional view schematically illustrating a part of a direct cylinder injection-type spark-ignition internal combustion engine equipped with a fuel injector 7 according to a first embodiment of the present invention. In FIG. 1, reference numeral 1 denotes an intake port and 2 denotes an exhaust port. The intake port 1 is communicated with the cylinder via an intake valve 3, and the exhaust port 2 is communicated with the cylinder via an exhaust valve 4. Reference numeral 5 denotes a piston, and 6 denotes a spark plug arranged in an upper part of the combustion chamber. The fuel injector 7 directly injects the fuel into the cylinder toward the top surface of the piston in the latter half of a compression stroke. In the top surface of the piston 5 is formed a deflection groove 5a for deflecting the fuel injected from the fuel injector 7 toward the spark plug 6.

Figure 2:
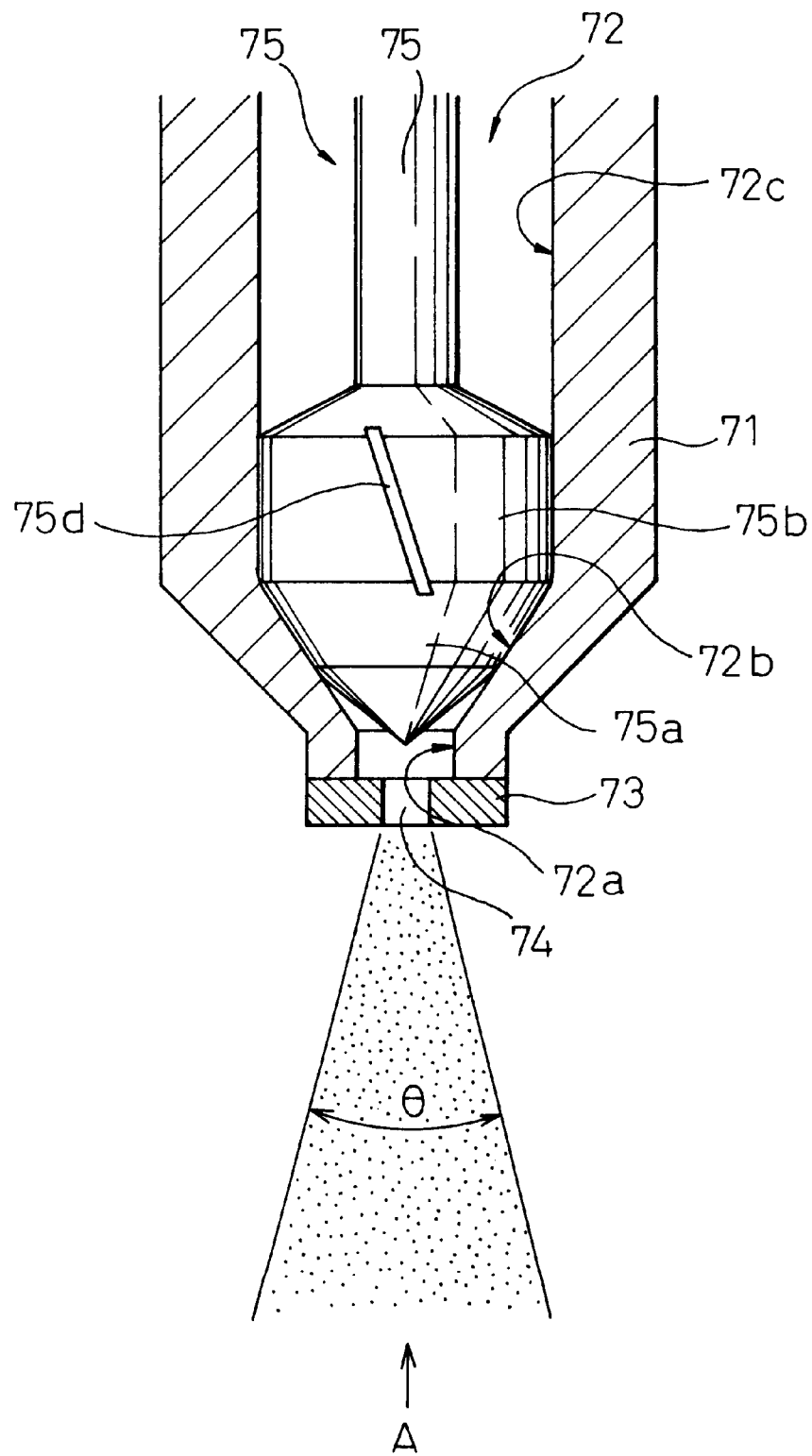
FIG. 2 is an enlarged sectional view illustrating the vicinity of an injection hole in the fuel injector of FIG. 1.
Figure 3:
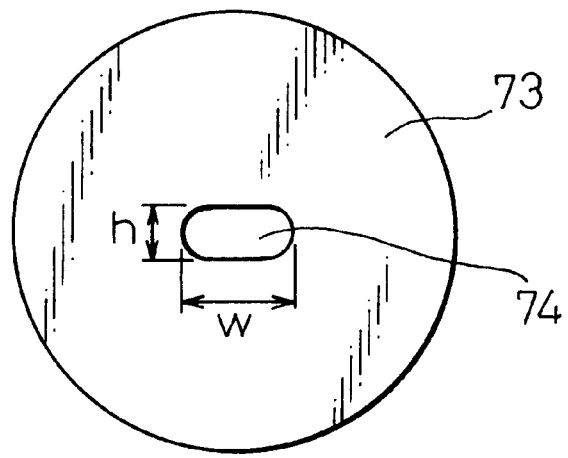
FIG. 3 is an enlarged view of when

FIG. 2 is an enlarged sectional view illustrating the vicinity of an injection hole of the fuel injection valve 7, and FIG. 3 is an enlarged view of part of FIG. 2 viewed from the direction of arrow A. In these drawings, reference numeral 71 denotes an injector body. A fuel passage 72 is formed in the injector body 71. A tip portion 73 which is a separate member is attached to the injector body 71 by welding or the like. An injection hole 74 is formed in the tip portion 73.

The fuel passage 72 has a first cylindrical portion 72a of a small diameter in contact with the injection hole 74, a second conical portion 72b in contact with the first portion 72a, and a third cylindrical portion 72c of a large diameter in contact with the second portion 72b. Reference numeral 75 denotes a valve body arranged in the fuel passage 72. The valve body 75 has a sealing portion 75a for bearing against the second portion 72b of the fuel passage 72 and closing the fuel passage 72, a slide portion 75b that slides on the third portion 72c of the fuel passage 72, and an operation shaft 75c connected to the slide portion 75b. A spiral groove 75d is formed on the slide portion 75b of the valve body 75 in a spiral form about the center axis of the injection hole 74.

To inject the fuel, the valve body 75 is pulled up in FIG. 2. Therefore, the high pressure fuel in the third portion 72c of the fuel passage 72 passes through the spiral groove 75d and is imparted with a swirl component about the center axis of the injection hole 74. Then, the fuel is supplied to the first portion 72a of the fuel passage 72 through the second portion 72b of the fuel passage 72, and is injected from the injection hole 74.

As shown in FIGS. 2 and 3, the injection hole 74 has an oblong circular shape in nearly constant cross section along the center axis. As described earlier, the fuel has been imparted with a swirling component about the center axis of the injection hole 74, before it is injected, and it passes through the injection hole 74 of the oblong circular cross section while swirling. Since the injection hole 74 has a width (w) greater than a height (h) thereof, more fuel having a velocity component in the direction of width of the injection hole than fuel having a velocity component in the direction of height of the injection hole is injected from the injection hole 74. The fuel having a velocity component in the direction of width of the injection hole nearly uniformly spreads in the direction of width, thereby to form a flat and triangular fuel spray which has a relatively small thickness and which is generally favorably diffused as shown in FIGS. 1 and 2. The triangular fuel spray enables all the fuel to come into sufficient contact with the air taken into the cylinder and is favorably atomized.

When the fuel injection valve 7 is used for the direct cylinder injection-type spark-ignition internal combustion engine shown in FIG. 1, the triangular spray formed by the injected fuel is deflected toward the spark plug 6 by the deflection groove 5a formed in the top surface of the piston as the fuel is injected in a compression stroke to accomplish a stratified combustion. The spray has a favorable degree of diffusion even on the sides and, hence, a deterioration in combustion due to overlean conditions can be prevented, and thus a favorable stratified combustion is realized. The thus formed fuel spray has a relatively small thickness, which makes it possible to increase the distance between the lowest and highest positions of the piston where the fuel can be deflected toward the spark plug 6 by the deflection groove 5*a* in the top surface of the piston. During this relatively long period, a relatively large amount of fuel can be injected, and the region of stratified combustion can be expanded toward the high-load side. Even if the fuel injection valve 7 is used for a direct cylinder injection-type spark-ignition internal combustion engine in which the fuel injected in a compression stroke directly forms a stratified fuel mixture near the ignition plug, a deterioration in combustion due to overlean conditions can be prevented, and thus a favorable stratified combustion is realized. Besides, since the thickness of the fuel spray is relatively small, the fuel does not impinge on the piston even if the piston considerably approaches the top dead center and the injection of the fuel can be continued. Thus, the fuel can be injected in a relatively large amount, and the region of the stratified combustion can be expanded toward the high-load side.

In a direct cylinder injection-type spark-ignition internal combustion engine in which a combustion chamber of a recessed shape is formed in the top surface of the piston, furthermore, the thickness of the fuel spray is still relatively small making it possible to increase the distance between the lowest and highest positions of the piston where the injected fuel can be introduced into the combustion chamber. Therefore, a relatively large amount of fuel can be introduced into the combustion chamber, and the region of stratified combustion can be expanded toward the high-load side. Furthermore, the triangular fuel spray formed by the fuel injector 7 of this embodiment has a favorable degree of diffusion even on the sides as described above. That is, the fuel is not excessively diffused on the sides of the triangular fuel spray, and the injected fuel is reliably confined within a predetermined angle (θ) in the direction of width. This is advantageous for reliably introducing all of the injected fuel into the combustion chamber in the direction of width. Confining the injected fuel within the predetermined angle (θ) in the direction of width is advantageous in injecting the fuel into an intended position when the fuel is injected at an intake stroke in the direct cylinder injection-type spark-ignition internal combustion engine or when the fuel is injected in the intake port injection-type internal combustion engine.

In this embodiment, the spiral groove 75*d* formed in the slide portion 75*b* of the valve body 75 is used for imparting a swirl component to the fuel. However, the spiral groove may be formed at any position if the swirl component can be imparted to the fuel before it is injected. The fuel injector 7 of this embodiment utilizes the swirl of the fuel in order to form the fuel spray of a triangular shape and, hence, the width of the injection hole needs not to be outwardly expanded at a predetermined angle unlike the prior art. This permits the injection hole to be easily machined enabling the machining cost to be reduced. When the width of the injection hole is outwardly expanded at a predetermined angle, as in the prior art, the portion of the fuel passage in contact with the injection hole must be formed in a conical shape or in a semispherical shape in order to decrease a difference in the fuel pressure depending upon the direction of injection. This, however, is not required in this embodiment, allowing the injector body to be easily machined. Moreover, the tip portion 73 in which the injection hole is formed is a separate member, making it easy to machine the injection hole. Besides, even if the injection hole is defectively machined, the tip portion only is spoiled.

Figure 4:
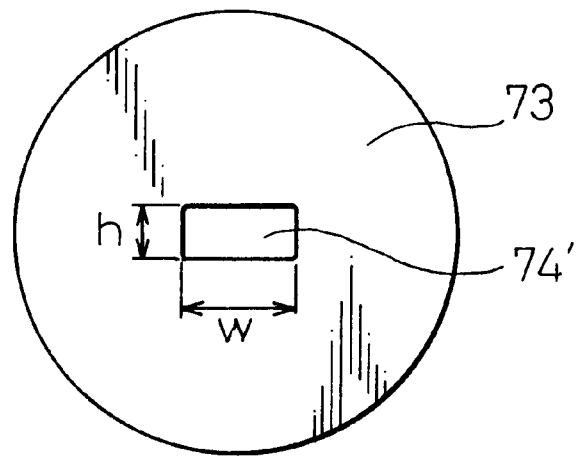
FIG. 4 is a view illustrating a modification of the injection hole.

FIG. 4 illustrates a modification of the injection hole. The injection hole 74' has a rectangular cross section. Preferably, the corners of the rectangle cross section are curved in order to allow the fuel to swirl in the injection hole 74' at the time of injecting the fuel. Like the above-mentioned injection hole 74 having an oblong circular cross section, the injection hole 74' has a width (w) greater than a height (h) thereof and, hence, more fuel having a velocity component in the direction of width of the injection hole than fuel having a velocity component in the direction of height of the injection hole is injected from the injection hole 74'. Therefore, the fuel having a velocity component in the direction of width of the injection hole nearly uniformly spreads in the direction of width, to thereby form a flat and triangular fuel spray which has a relatively small thickness and which is generally favorably diffused as shown in FIGS. 1 and 2.

Figure 5:
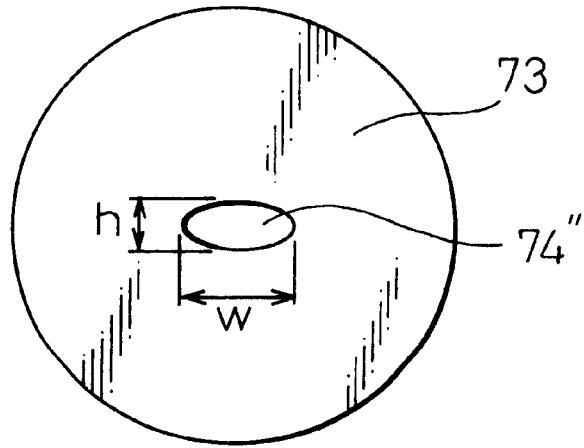
FIG. 5 is a view illustrating another modification of the injection hole.

FIG. 5 illustrates another modification of the injection hole. This injection hole 74" has an elliptical cross section. Even employing this cross-sectional shape, the injection hole possesses a width (w) larger than a height (h) thereof. Therefore, more fuel having a velocity component in the direction of width of the injection hole than fuel having a velocity component in the direction of height of the injection hole is injected from the injection hole 74", thereby to form a flat and triangular fuel spray which has a relatively small thickness and which is generally favorably diffused.

Figure 6:
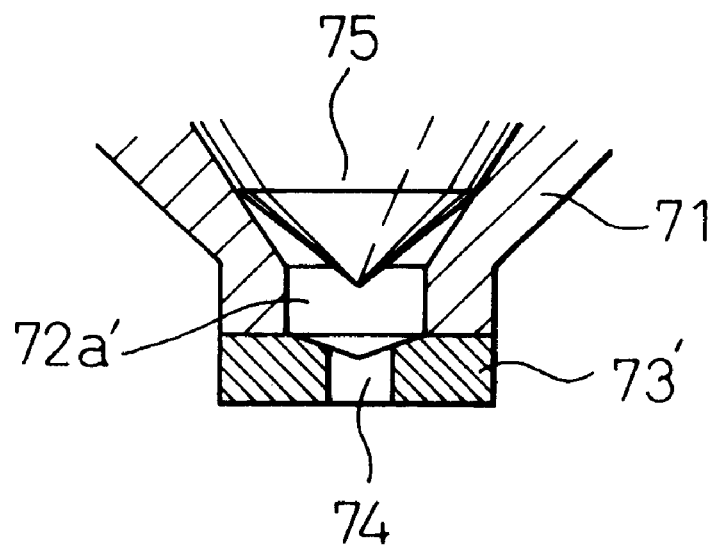
FIG. 6 is a view illustrating a modification of the third portion contacting the injection hole of a fuel passage.

FIG. 6 illustrates a modification of the first portion that is in contact with the injection hole of the fuel passage. The first portion 72*a*' is constituted by a cylindrical portion of a small diameter formed in the injector body 71, and a conical portion formed in a tip portion 73' thereof. According to the first portion 72*a*', the injected fuel possesses a pressure component in the direction of width of the injection hole 74, and is further easily spread in the direction of width of the injection hole.

Figure 7:
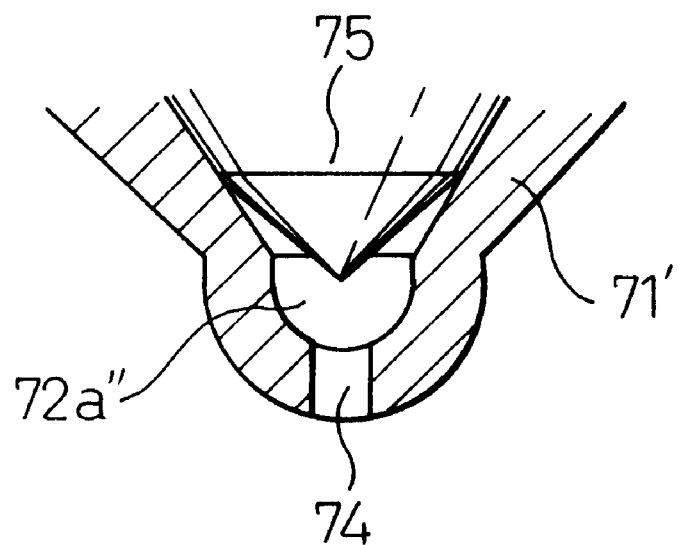
FIG. 7 is a view illustrating another modification of the third portion contacting the injection hole of the fuel passage.

FIG. 7 illustrates a further modification of the first portion in contact with the injection hole of the fuel passage. The first portion 72*a*" is formed of a semispherical portion machined in the injector body 71'. If the third portion is formed in a semispherical shape, the injected fuel possesses the pressure component in the direction of width of the injection hole 74, and is further easily spread in the direction of width of the injection hole.

The first portion of the fuel passage is the spherical shape and contacts the injection hole. However, in the first portion, no portion other than the boundary portion to the injection hole affects the direction for pressurizing the fuel. Accordingly, the same effect is obtained if the boundary line to the injection hole 74 is an arc on a transverse plane within the height of the injection hole. Based upon a similar idea, the boundary line to the injection hole 74 may be folded on the transverse plane within the height of the injection hole even if hole the third portion of the fuel passage is not of a conical shape.

What is claimed is:

1. A fuel injector for an internal combustion engine comprising an injection hole which has a width larger than a height thereof, and means for imparting the fuel, before being injected, with a swirl component about the center axis of said injection hole such that the fuel nearly uniformly spreads in the direction of the width and forms a flat and triangular fuel spray emitting from the injection hole that can be favorably diffused with air.

2. A fuel injector according to claim 1, wherein said injection hole has a nearly constant transverse sectional shape along said center axis.

3. A fuel injector according to claim 1, wherein said injection hole has a rectangular cross-section with curved corners.

4. A fuel injector according to claim 1, wherein said injection hole has an oblong circular cross-section.

5. A fuel injector according to claim 1, wherein said injection hole has an elliptical cross-section.

6. A fuel injector according to claim 1, wherein a bottom surface of said injection hole is planar.

7. A fuel injector according to claim 1, wherein said fuel injector has a body and said injection hole is formed on a tip member that is separate from said fuel injector body and subsequently affixed to said fuel injector body.

8. A fuel injector according to claim 7, wherein said injector body includes a first portion adjacent said tip member, a second conical section adjacent said first portion and a cylindrical third portion adjacent said second portion.

9. A fuel injector according to claim 8, wherein a valve body is slidably provided in said injector body.

10. A fuel injector according to claim 9, wherein said valve body includes a sealing portion engageable with said second conical section of said injector body and a slide portion slidable along said cylindrical third portion of said injector body.

11. A fuel injector according to claim 10, wherein said slide portion is provided with at least one spiral groove serving as said means for imparting the fuel with a swirl component.

12. A fuel injector according to claim 10, wherein said third portion includes a cylindrical portion and an adjacent surface of said tip member is conical.

13. A fuel injector according to claim 10, wherein said third portion is semispherical.

14. A fuel injector according to claim 13, wherein a bottom of said semispherical third portion mates with said injection hole.

* * * * *